United States Patent [19]
Kyle

[11] Patent Number: 6,141,681
[45] Date of Patent: Oct. 31, 2000

[54] METHOD OF AND APPARATUS FOR TRANSFERRING AND INTERPRETING A DATA PACKAGE

[75] Inventor: David Kyle, Austin, Tex.

[73] Assignee: Advanced Micro Devices, Inc., Sunnyvale, Calif.

[21] Appl. No.: 08/915,555

[22] Filed: Aug. 21, 1997

Related U.S. Application Data

[60] Provisional application No. 60/038,958, Mar. 7, 1997.

[51] Int. Cl.[7] ........................................... G06F 15/16
[52] U.S. Cl. .................. 709/206; 709/200; 709/202; 709/246
[58] Field of Search .................. 395/200.32, 200.61, 395/200.76, 200.77; 709/221, 222, 223, 200, 207, 208, 202, 206, 246

[56] References Cited

U.S. PATENT DOCUMENTS

| | | | |
|---|---|---|---|
| 5,283,887 | 2/1994 | Zachery | 395/500 |
| 5,522,041 | 5/1996 | Murakami et al. | 395/200.01 |
| 5,627,997 | 5/1997 | Pearson et al. | 395/500 |
| 5,634,005 | 5/1997 | Matsuo | 395/200.02 |
| 5,694,580 | 12/1997 | Narita et al. | 395/500 |
| 5,748,894 | 5/1998 | Ishizaki et al. | 395/200.04 |
| 5,835,789 | 11/1998 | Ueda et al. | 395/853 |
| 5,844,691 | 12/1998 | Nishiyama et al. | 358/434 |
| 5,845,090 | 12/1998 | Collins, III et al. | 709/221 |
| 5,848,415 | 12/1998 | Guck | 707/10 |

*Primary Examiner*—Zarni Maung
*Assistant Examiner*—Saleh Najjar
*Attorney, Agent, or Firm*—Foley & Lardner

[57] ABSTRACT

A data transfer system includes a first computer which is operative to generate a data package having a data portion and an instruction portion. A second computer receives the data package through a transport media. The second computer is responsive to the data package to process the data portion in accordance with the instruction portion.

14 Claims, 11 Drawing Sheets

METHOD OF AND APPARATUS FOR TRANSFERRING AND INTERPRETING A DATA PACKAGE

RELATED APPLICATIONS

This application claims priority to provisional application 60/038,958, filed Mar. 7, 1997.

BACKGROUND OF THE INVENTION

1. Field of the Invention

The invention relates to data communication between computers. More specifically, the invention relates to a method of and apparatus for transferring a data package including an instruction portion and a data portion wherein a receiving computer uses the instruction portion to process the data portion.

2. Related Art

On-line computer services, such as electronic bulletin boards, offer computer user's access to data. The data is typically held remotely at a host or server. A local computer user or client establishes communication with the host in order to peruse the available data items. After locating a desired data item, a computer user may want access to the data locally without having to re-establish communication with the host. Typically, the computer user would download the data from the host to the local computer.

FIG. 1 shows a conventional arrangement in which a local computer 124 is connected to a host computer 120 over a communication link 128. The local computer 124 requests data 132 from the host computer 120. The host computer 120 transmits data 132 to the local computer 124.

Conventional computer systems are programmed to accommodate only certain types of data. If, for example, local computer 124 is configured to run operating system A, and data 132 is configured for operating system B, it is likely that data 132 is not accommodated on local computer 124. In this situation, data 132 is referred to as incompatible with local computer 124.

Another example is application specific data. If, for example, local computer 124 has a word processor application X, and data 132 is formatted for word processor application Y, then data 132 is likely to be incompatible with word processor application Y.

Data incompatibilities can arise, for example, with respect to computer hardware platforms, operating systems, and applications. Even with respect to data configured for a particular platform, operating system, or application, incompatibilities can arise with respect to the version of platform, operating system, or application for which the data is configured.

Therefore, a problem occurs if local computer 124 cannot process data 132. If local computer 124 attempts to process incompatible data, an error occurs. Such an error may cause the computer to stop normal operation or "hang." The error may cause an error report or the application which operates on the incompatible data may simply not work in the intended manner.

A conventional solution to this problem is to provide translators or interpreters on the local computer which convert from one format or configuration of data to another format or configuration which is compatible with the local computer. In the above examples, if data 132 could be reconfigured for operating system A or reformatted for word processor application Y, then the compatibility problem could be overcome. Such interpreters may be an integral part of an application, such as a word processor which accepts many formats, or may be a separate program running on the local computer. However, a problem occurs in that each translator or interpreter consumes additional local computer resources, such as storage space on a hard disk drive, and may be available only at additional cost to the user.

Another conventional approach to this problem is to standardize on a single format for a particular type of application. However, standardization raises problems philosophically by inhibiting experimentation and innovation which cannot be accommodated by the standard. Standardization is also subject to practical problems such as having an industry agree on the standard. Reaching agreement on standards is especially difficult in the software industry because of the numerous and diverse software development companies.

The above conventional solutions have a further problem in that the user is required to know the characteristics of the user's local computer, the user's applications, and the compatibility of the local computer and applications with the data on the host computer. Moreover, as more sources of data become available, more formats must be supported and it becomes difficult for the user to manage compatibility issues.

The problem is exacerbated on broad-based on-line services, such as those based on the internet, because of the diversity of computer platforms, operating systems, and applications which have access to the on-line data. Often, compatibility problems are not apparent from the data itself. A local computer user can waste valuable time and resources by downloading incompatible data.

What is needed is a communication system which transparently manages compatibility of data between a host and a local computer.

SUMMARY OF THE INVENTION

It is an object of the invention to overcome the above and other problems with transferring and interpreting incompatible data.

The above and other objects are accomplished by a method of transferring and interpreting a data package in which the host computer responds to a local computer's request for data by assembling a data package which includes an instruction portion and a data portion. The host forwards the data package to the local computer. The local computer has an interpreter which uses the instruction portion of the data package to process the data portion. The instruction portion may include, for example, instructions on how to decode the data portion or how to reformat the data portion for compatibility. The instruction portion may be executable code which the interpreter runs to operate on the data portion.

BRIEF DESCRIPTION OF THE DRAWINGS

The above and other objects of the invention are accomplished according to the invention described herein with reference to the drawings in which:

FIG. 7 shows a flow diagram of a method according to the invention for transferring and interpreting the data package shown in FIG. 6a;

DETAILED DESCRIPTION OF THE PREFERRED EMBODIMENTS

Figure 1:
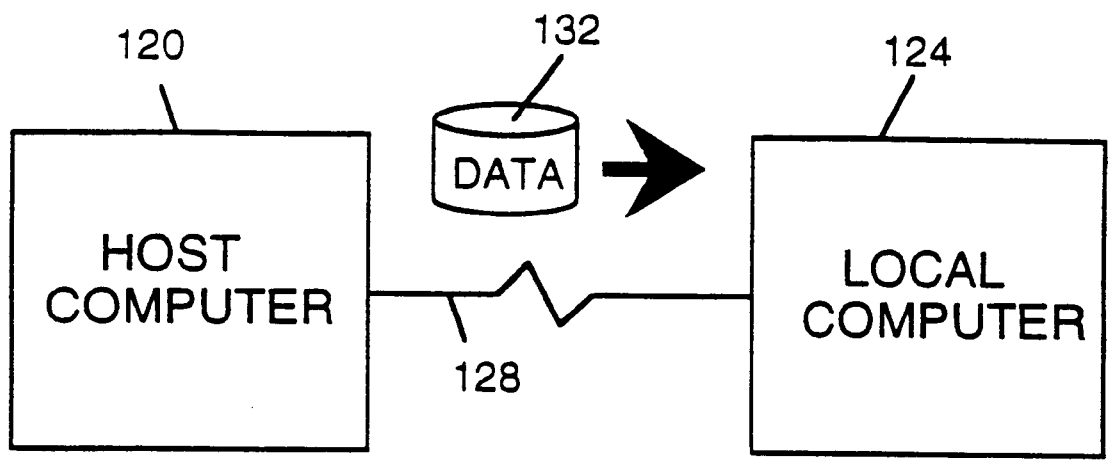
FIG. 1 shows a block diagram of a conventional system for transferring data between a local computer and a host computer.
Figure 2:
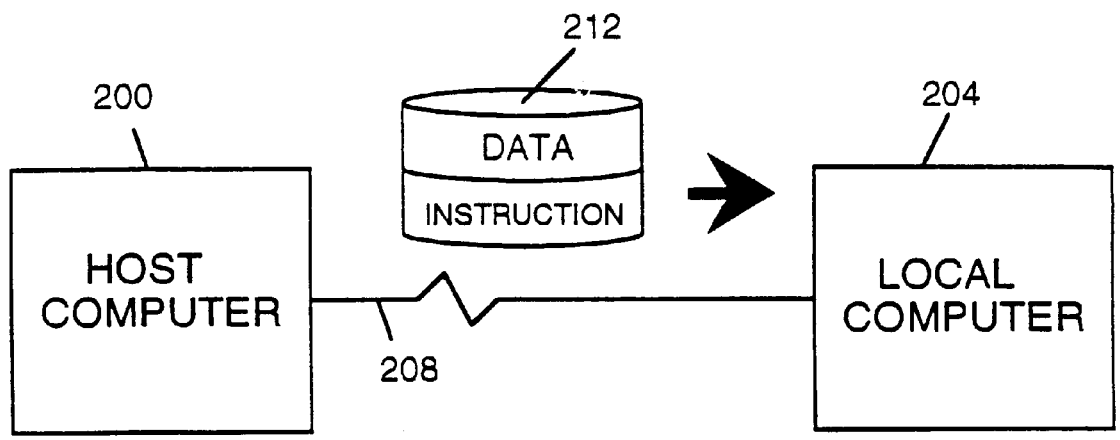
FIG. 2 shows a block diagram of a first embodiment of a system according to the invention for transferring and interpreting data.

FIG. 2 shows a block diagram of a first embodiment of a system according to the invention for transferring and interpreting data. On a host computer 200, data is combined with instructions in a single data package 212 which is treated as an object which conveys its own behavior in a destination system, local computer 204. Host computer 200 may be, for example, an internet source while local computer 204 may be, for example, a user's personal computer.

The data package 212, which includes data and instructions, is moved through a transport media 208, such as conventional modem communication over telephone lines, to local computer 204. Transport media 208 may also include other forms of data delivery including manual delivery via floppy disk, tape cartridge, or CD-ROM. As is more fully described below with reference to FIG. 4, in the local computer 204, the data package 212 is operated on by an interpreter which separates the instructions from the data and distributes the data to the appropriate location(s) in the local computer 204 in accordance with the instructions.

Figure 3:
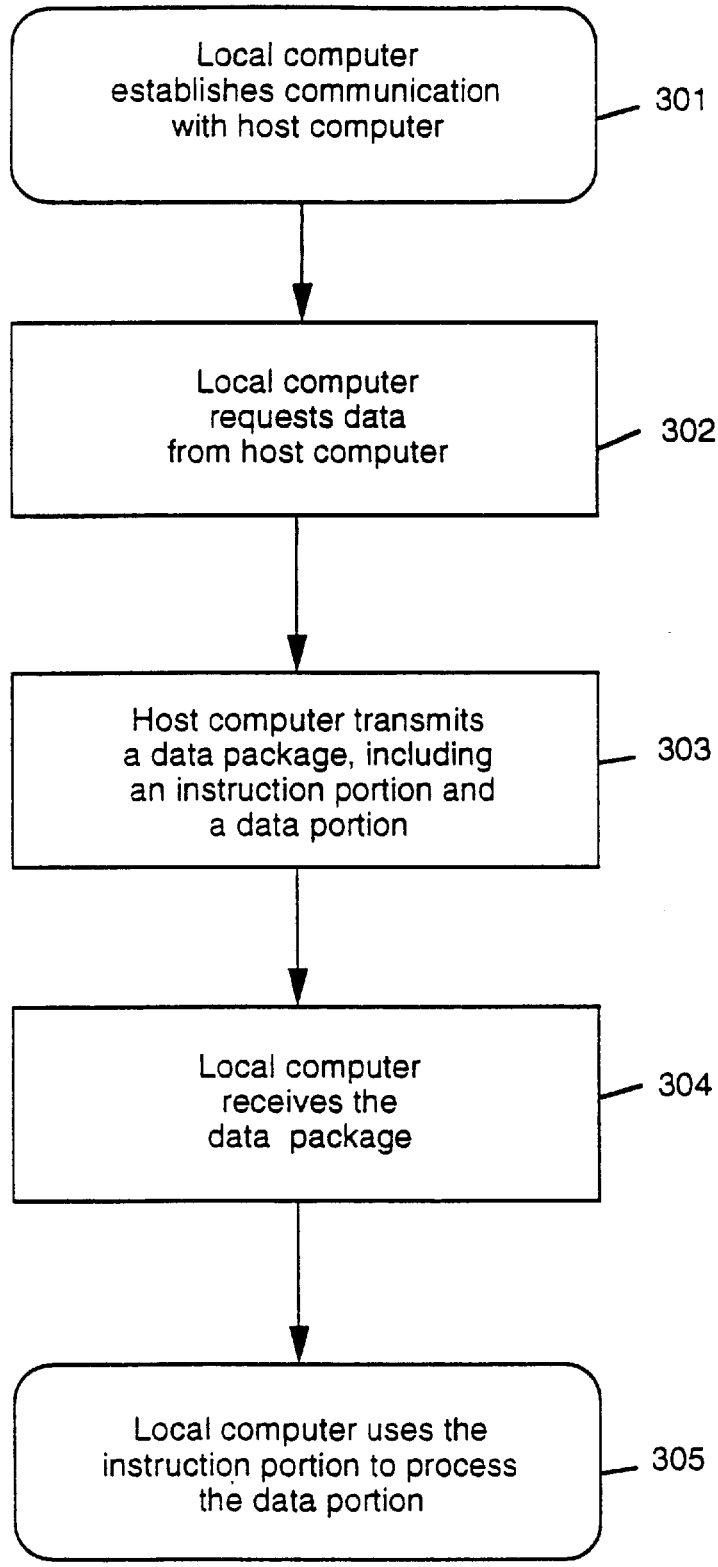
FIG. 3 shows a flow diagram of a method of transferring and interpreting data according to the invention.

FIG. 3 shows a flow diagram of a method of transferring and interpreting data according to the invention. In step 301, a local computer establishes communication with a host computer. In step 302, the local computer requests data from the host computer. The host computer, in step 303, transmits a data package, including an instruction portion and a data portion. In step 304, the local computer receives the data package. In step 305, the local computer uses the instruction portion to process the data portion.

Figure 4:
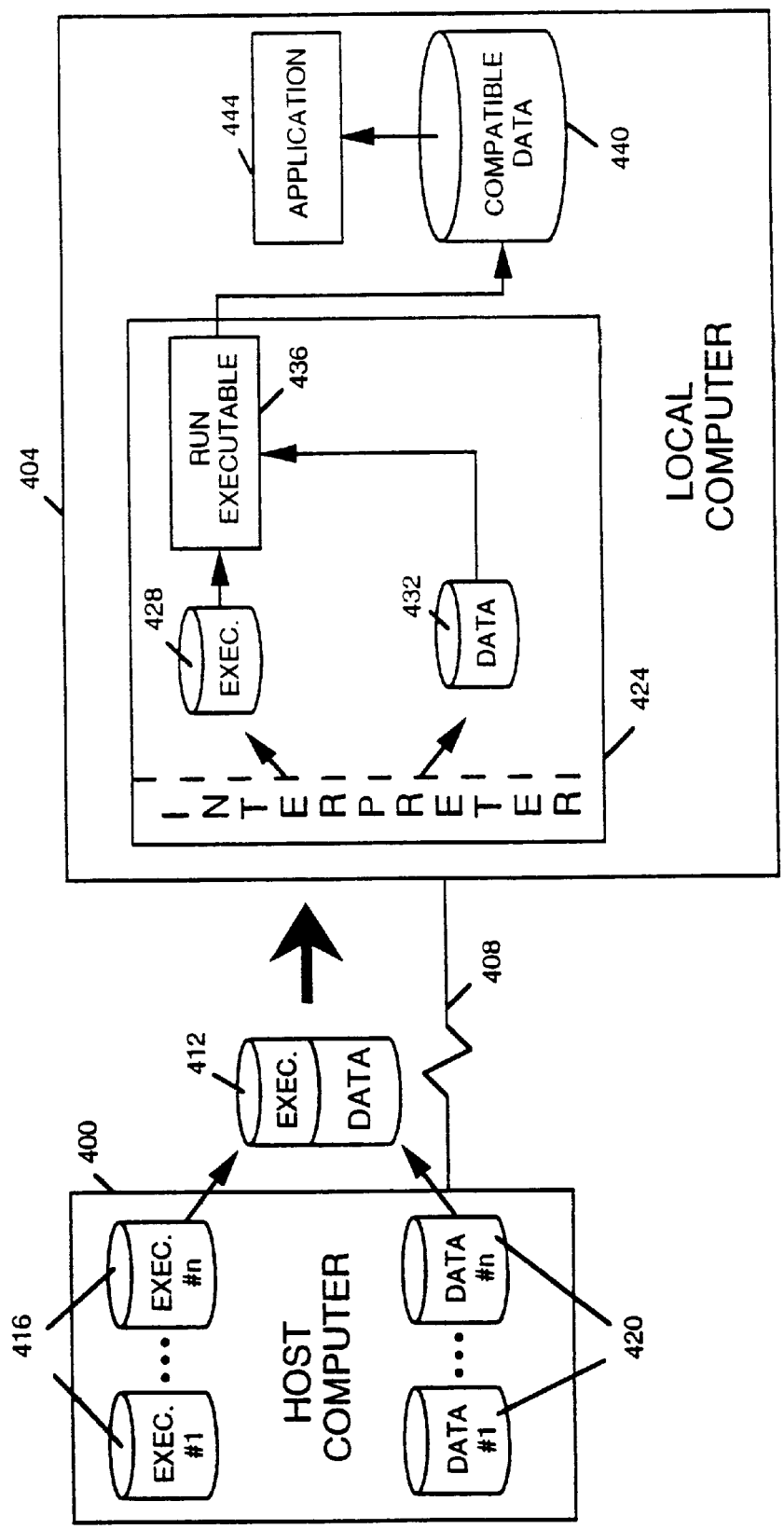
FIG. 4 shows a block diagram of a second embodiment of a system according to the invention for transferring and interpreting data.

FIG. 4 shows a block diagram of a second embodiment of a system according to the invention for transferring and interpreting data. A local computer 404 is in communication with a host computer 400 over a communication link 408. The host computer 400 has a plurality of executable instructions 416 and a plurality of data items 420. The local computer 404 requests a particular data item from the host computer 400. The host computer assembles and transmits a data package 412 comprising the requested data item and its corresponding executable instructions.

The local computer has an interpreter 424 which receives the data package 412 and separates the data package 412 into a local executable portion 428 and a local data portion 432. The interpreter 424 performs a processing step 436. The processing step 436 runs the local executable portion 428 which operates on the local data portion 432 in order to create compatible data 440 which is compatible with local computer application 444.

Figure 5:
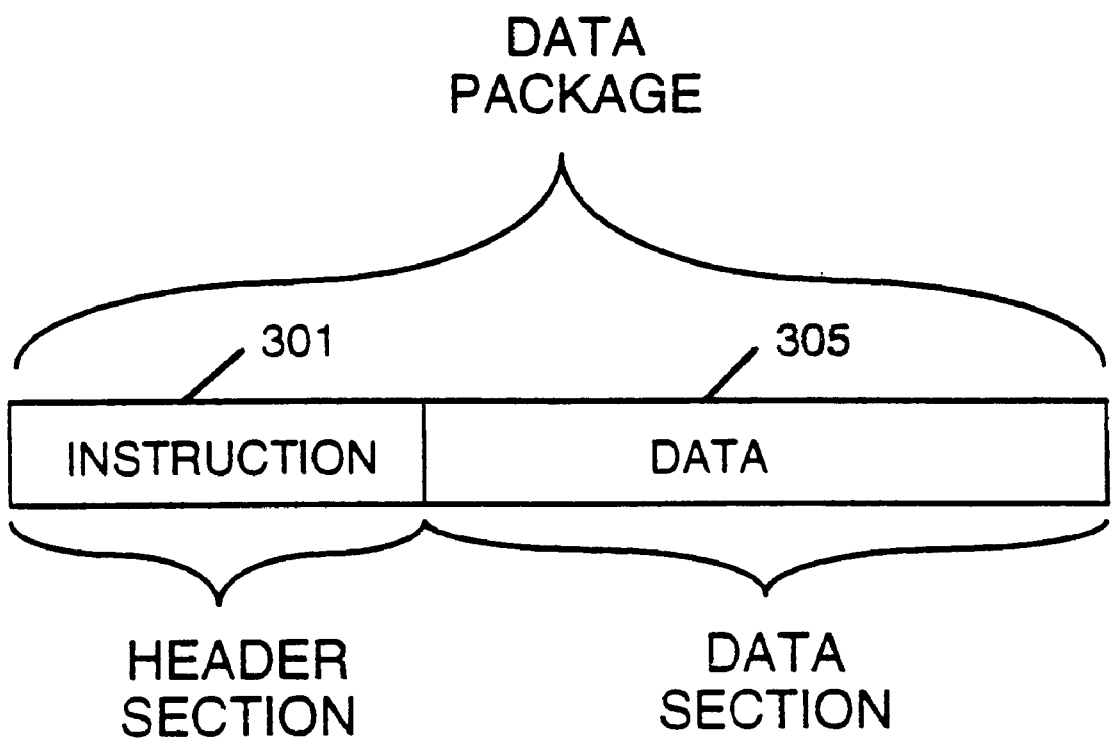
FIG. 5 shows a representation of a data package according to the invention.

In the exemplary data representation shown in FIG. 5, instructions 501 are contained in a header section of a data package and data 505 is contained in a data section of the data package. The header section is prefixed to the data section of the data package. The instructions 501 may comprise executable code which can run on the local computer and operate on the data 505, for example, to translate the data 505 into data which is compatible with the local computer. The instructions 501 may also comprise other forms of instructions which are operable on the local computer, such as a batch file or a shell script.

For example, if data 505 represents a video file in format 1, the instructions 501 may be executable code which reformats the data 505 into a video file in format 2 which is compatible with a video player on the local computer. Alternatively, the executable code may be an upgrade to the video player on the local computer which accepts format 1. For example, the multi-media player extended graphics (MPEG) is a standard video file format. If a new and improved MPEG standard is made available, the executable code could update the video player to handle the new standard. Alternatively, if the local computer lacks a video player altogether, the executable code could be the video player itself.

FIGS. 6a–6e are representations of data packages according to the invention.

Figure 6A:
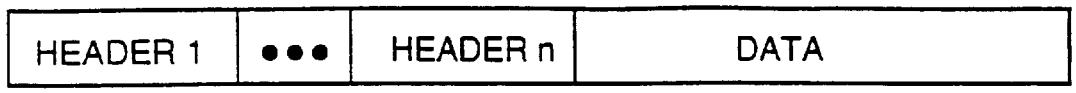
FIGS. 6a–6e are representations of data packages according to the invention.

FIG. 6a shows a representation wherein multiple headers are prefixed to the data section. Each header section could correspond, for example, to a different platform. This representation provides advantages for broadcasting data to multiple platform types, hereinafter referred to as "multicast". In a multicast situation, the local computer would be responsive to the data package to select the appropriate header according to local computer characteristics, such as the platform type of the local computer.

Figure 7:
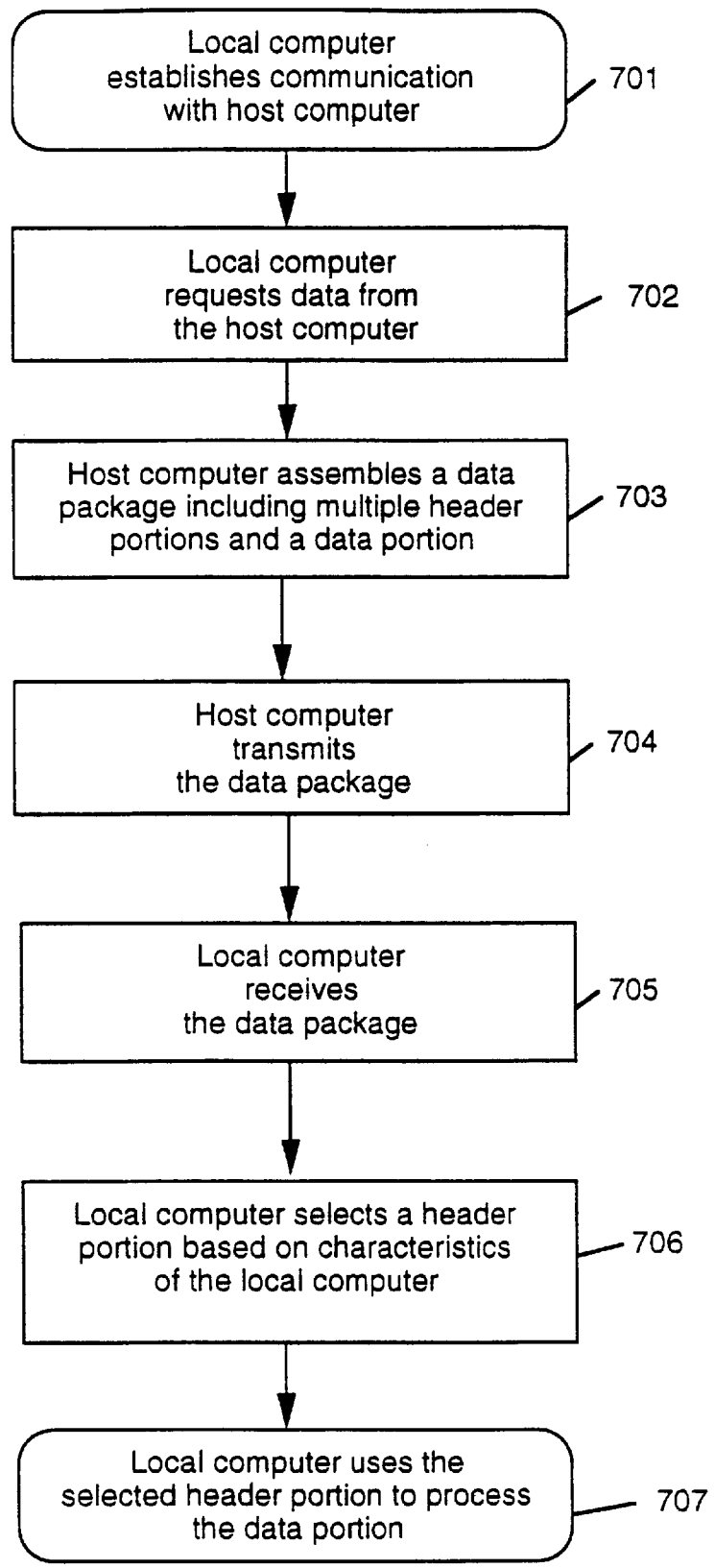

FIG. 7 shows a flow diagram of a method according to the invention for transferring and interpreting the data package shown in FIG. 6a. A first step 701 is for a local computer to establish communication with a host computer. In step 702, the local computer requests data from the host computer. The host computer, in step 703, assembles a data package, including multiple header sections and a data section. In step 704, the host computer transmits the data package to the local computer. In step 705, the local computer receives the data package. The local computer, in step 706, selects one of the header sections based on characteristics of the local computer, such as the platform type of the local computer. And, in step 707, the local computer uses the selected header section to process the data section of the data package.

Figure 6B:
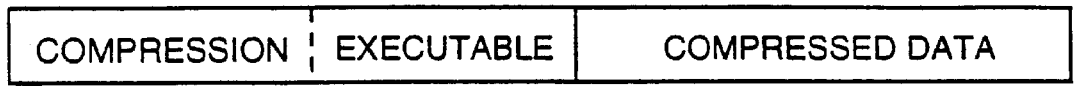

FIG. 6b shows a representation of a data package wherein a header subsection of the data package contains uncompression instructions. This representation provides advantages in that it accommodates new data compression techniques. Such techniques are always being developed but cannot be utilized without disseminating the uncompression software. The present invention solves this problem by disseminating the uncompression instructions with the data package.

Figure 6C:

FIG. 6c shows a representation of a data package wherein a header subsection of the data package contains decryption instructions. This representation provides advantages in that it accommodates new data encryption techniques. As discussed above with reference to data compression, encryption techniques are also always being developed but cannot be utilized without disseminating the decryption software.

Including decryption code as part of the data package offers further advantages for data security. Encrypted data is typically distributed separately from an encryption "key." The particular method of encryption can be changed without changing the encryption key. Persons who endeavor to defeat the security by "hacking" typically discover only the particular method of encryption and not the encryption key. This type of "hacking" requires significant effort on the part of the hacker.

Even if standard encryption techniques are applied, the method according to the invention is advantageous because by frequently changing the particular method of encryption without changing the key, the hacker is substantially defeated while the legitimate user is unaffected. The encrypted data may also be maintained separate from the decryption code for further data security. The decryption code would be assembled with the encrypted data only upon a request from a legitimate user.

Moreover, a data package could utilize multiple decryption header subsections with a plurality of different decryption instructions corresponding to different encryption methods applied to a single data item and/or the other various header subsections of the data package. Utilizing multiple decryption header subsections provides further data security because it would be more difficult and time consuming for a hacker to defeat each particular method individually.

Figure 6D:

FIG. 6d shows a representation of a data package wherein a header subsection of the data package contains anti-virus instructions. This representation provides advantages in that it accommodates just-in-time virus checking of downloaded data. New viruses are always being discovered. Including anti-virus instructions as part of the data package allows the user to have the most up-to-date virus checking performed on downloaded data prior to the data being stored on the local computer. The virus check can be done in conjunction with data validation as the data package is received.

Anti-virus software generally requires some knowledge of existing viruses. As new viruses are discovered, a check for the new virus can be incorporated into the anti-virus header subsection instructions. Such a check may be based, for example, on signatures or code sequences of known viruses. The anti-virus instructions may also check for activities typical of viruses. Other virus checking techniques could also be used.

The above scheme could be further improved by having the host run the most up-to-date anti-virus check on the anti-virus software itself. After the host, or on-line service provider, is satisfied that the anti-virus software is virus-free, the software can be encrypted and broadcast to the on-line service subscribers. Such a broadcast could take the form of the above-described "multicast" wherein the local computer would choose from one of a plurality of headers corresponding to the appropriate executable code for the local computer.

Figure 6E:
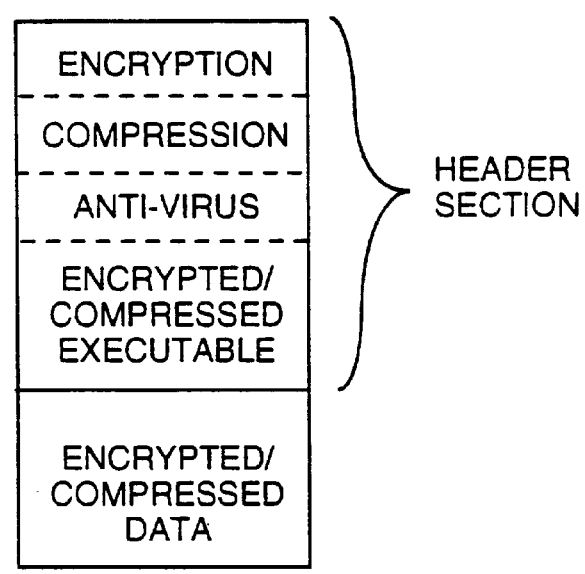

FIG. 6e shows a representation wherein multiple executables are contained in subsections of the header section. The subsections include instructions for decryption, uncompression, and virus checking. The header also includes an executable subsection which has been compressed and encrypted in accordance with uncompression and decryption subsections.

Figure 8:
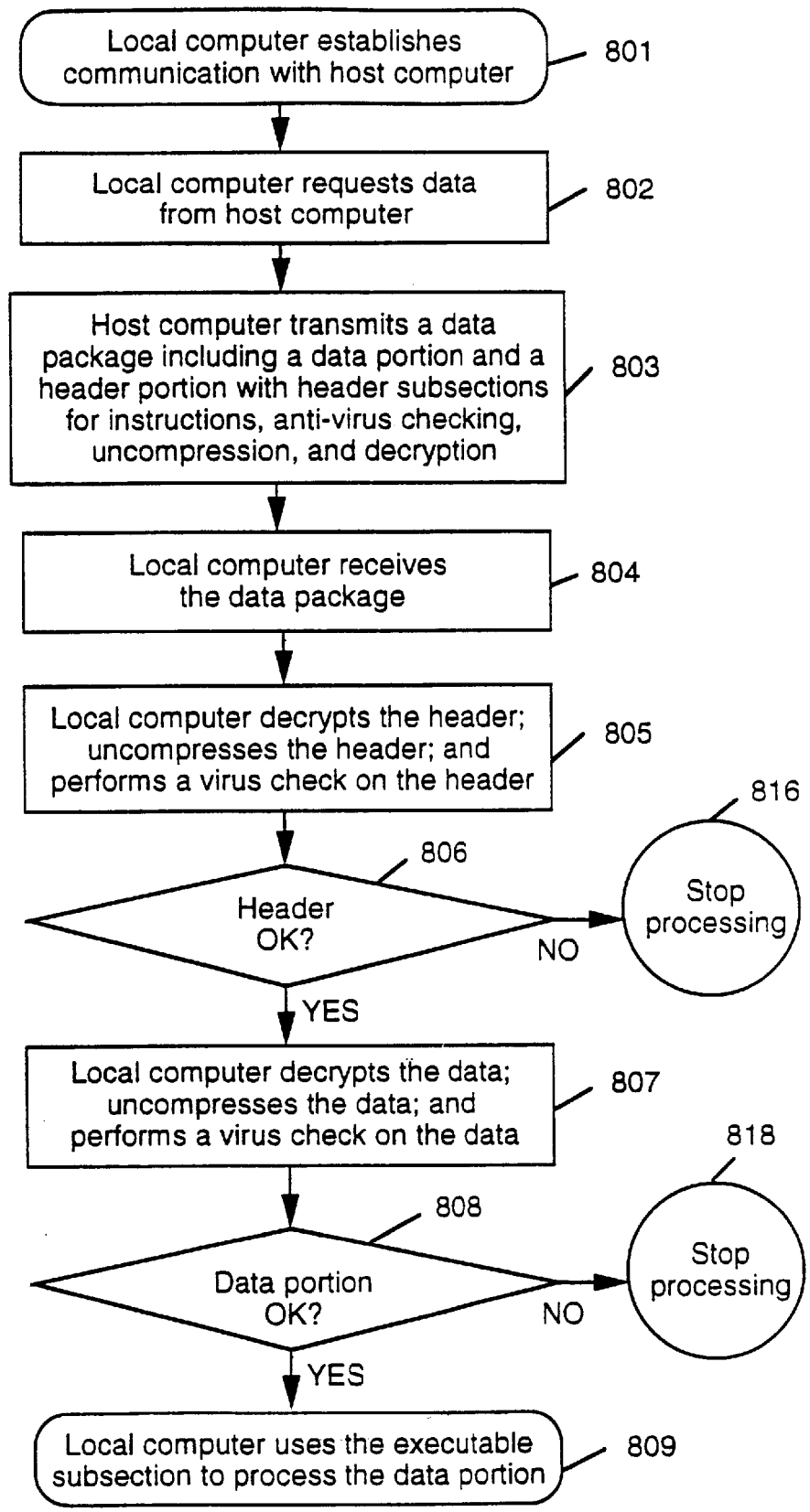
FIG. 8 shows a flow diagram of a method according to the invention for transferring and interpreting the data package shown in FIG. 6e.

FIG. 8 shows a flow diagram of a method according to the invention for transferring and interpreting the data package shown in FIG. 6e. In step 801, a local computer establishes communication with a host computer. In the next step 802, the local computer requests data from the host computer. The host computer, in step 803, assembles and transmits a data package as described in FIG. 6e. In step 804, the local computer receives the data package.

First, in step 805, the local computer uses the decryption subsection to decrypt the header section of the data package. Then the local computer uses the uncompress subsection to uncompress the header. Lastly, still in step 805, the local computer performs a virus check on the header. In decision step 806, the local computer checks the results of the foregoing decryption, uncompression, and virus check to determine if it should proceed. If decision step 806 decides not to proceed, processing is stopped at step 816. Otherwise, processing proceeds to step 807.

First, in step 807, the local computer uses the decryption subsection to decrypt the data section of the data package. Then the local computer uses the uncompress subsection to uncompress the data. Lastly, still in step 807, the local computer performs a virus check on the data. In decision step 808, the local computer checks the results of the foregoing decryption, uncompression, and virus check to determine if it should proceed. If decision step 808 decides not to proceed, processing is stopped at step 818. Otherwise, processing proceeds to step 809.

In step 809, the local computer uses the executable subsection to process the data section of the data package.

Figure 9:
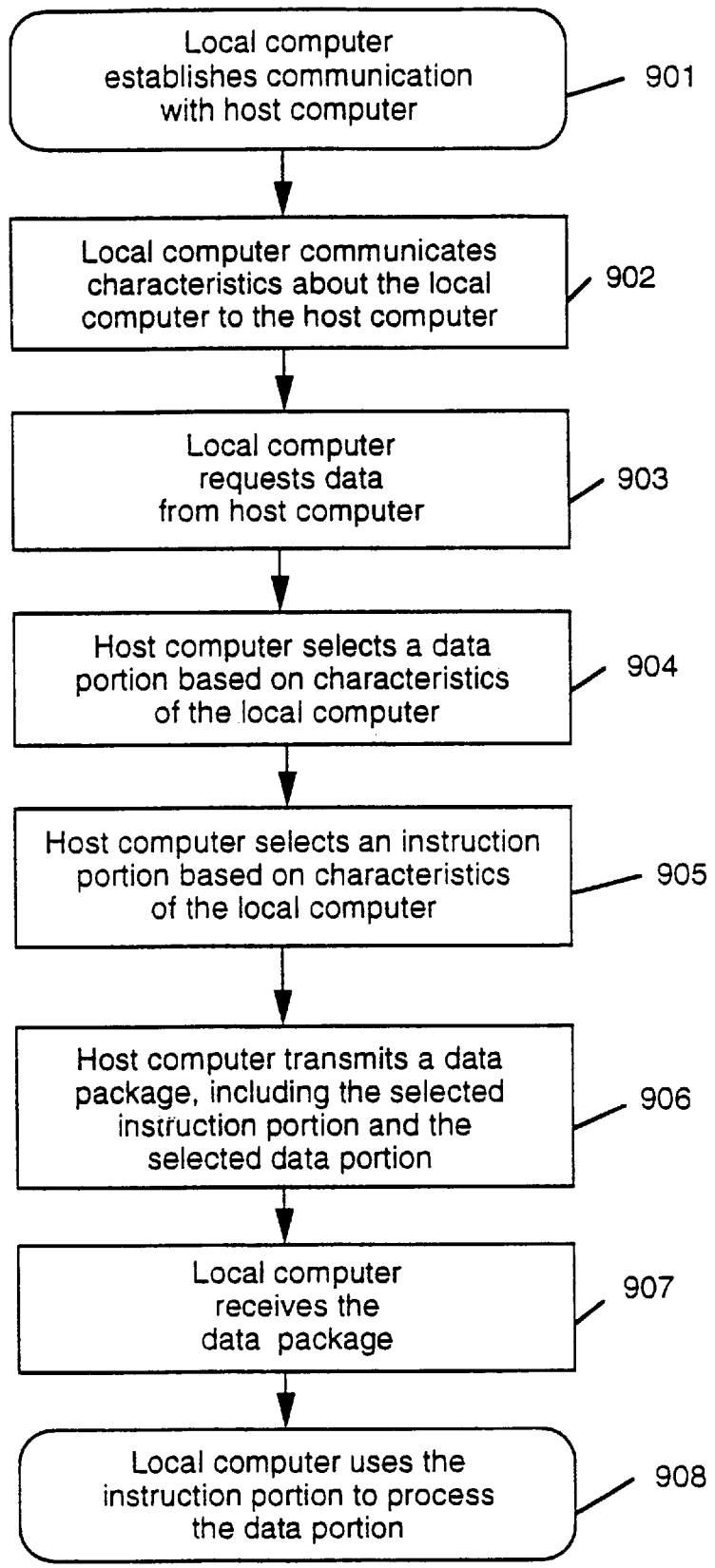
FIG. 9 shows a flow diagram of a method according to the invention for transferring and interpreting data based on characteristics of a local computer.

FIG. 9 shows a flow diagram of a method according to the invention for transferring and interpreting data based on characteristics of a local computer. In step 901, the local computer establishes communication with a host computer. Next, in step 902, the local computer communicates a characteristic corresponding to the local computer to the host computer. In step 903, the local computer requests data from the host computer. The host computer, in step 904, selects a data portion based the communicated characteristic and, in step 905, the host computer selects an instruction portion based on the communicated characteristic. In step 906, the host computer assembles and transmits a data package, including the selected instruction portion and the selected data portion to the local computer. The local computer receives the data package in step 907. And, in step 908, the local portion uses the instruction portion to process the data portion.

For example, a communication handshake could identify characteristics about the local computer, such as the platform type, and the host computer would be responsive to the local characteristics to choose appropriate instructions, such as executable code which is compatible with the local computer platform type.

Alternatively, the local computer may identify particular formats of data which are compatible with the local computer platform, operating system, and applications. The host would compare the data formats against what the host has available and would transmit a compatible format if possible. In this situation, the data may require no header or a minimal header section.

If no directly compatible format was available, the host could check for available instructions/executable code which would translate an available format into an identified compatible format and assemble a data package accordingly. Finally, if no directly or indirectly compatible format was available, the host could send a data package including a header section with instructions to that effect.

This last feature provides advantages in that the user can request value added data. Some formats may be more desirable to the user, such as high definition graphics or wide screen video files. In this situation, the local computer may communicate characteristics to the host such as installed equipment, i.e. stereo sound card and high resolution monitor, and software capabilities, i.e. full motion video. In response, the host could assemble a data package including a data section which takes advantage of the local computer's enhanced hardware configuration, and a header section with instructions/executable code to take advantage of the local computer's software capabilities.

Depending on the particular on-line service and/or licensing scheme, the user may be charged differentially for value-added data versus non-value-added data.

Alternatively, the user could request that the host not send the most demanding, resource consuming data. For example, one format may be more demanding of the local computer's capabilities, such as full-motion video. Even though the local computer's application is compatible with full-motion video, the user's experience may be less than optimal in using that format. In this situation, the local computer may request the host computer to send less demanding data, such as still frame graphics.

If the local computer has made a request which results in executable code being downloaded, the local computer could save the downloaded executable code. This may be advantageous if the user anticipates making multiple transfers of data which requires similar processing for compatibility. The local computer could communicate to the host that the local computer has retained the executable code, and future downloads which require the executable code could utilize the local copy. In this situation, the instruction portion would be reduced in size and would merely instruct the local computer to use its local copy.

The characteristics communicated might include a version of the retained executable code. Upon future requests for similar data, the host could compare versions of the host's executable code with the version of the local copy and download an updated copy if necessary or desired.

However, saving the downloaded executable code is not necessarily desirable. For example, if the data transfer is a one time occurrence and the interpretation is needed merely for platform compatibility, then it may not be desirable to retain the executable code once the transfer has been completed because the executable code would consume local computer resources such as hard disk space. In this situation, the executable may be stored only in the local computer's memory. When the translation is done or when the communication session is disconnected the memory is freed and the executable code is not stored to disk.

Alternatively, if the executable code is stored to disk, other restrictions could be placed on its use. These restrictions might include a date limitation or time of execution limitation. If the user wished to retain the executable code indefinitely, conventional purchase and/or licensing schemes could be applied.

The above-described method according to the invention is advantageous because it provides flexibility in the use of downloaded executables such as data translators. If a translator is needed only for a one-time transfer, the user does not need to purchase the translator, install it on the user's disk, and learn how to operate the translator. Rather, the translator is transparently downloaded with the data, it is run once automatically, it is removed from memory following the translation, and the user is charged only for the data with perhaps a nominal additional charge for the translation. However, if the user wishes to retain the translator, it is downloaded automatically with desired data and automatically configured for future use, all of which occurs transparently to the user.

Another advantage can be achieved by having downloaded anti-virus instructions work in conjunction with an anti-virus application resident on the local computer. A concern with downloading anti-virus executable code for virus checking is that the downloaded code itself may contain a virus. However, by making the host aware of the availability of an anti-virus application on the local computer, the anti-virus instructions could first call the local computer's anti-virus application to check the downloaded anti-virus executable code. After the executable code is checked, the downloaded code could assume further virus checking of the downloaded data. The local computer's anti-virus application could then be updated with the downloaded anti-virus code.

A particularly advantageous embodiment according to the invention has the local characteristics maintained in the form of a profile. Preferably, the profile contains as complete a description of the local computer as possible in terms of hardware platform and capabilities, operating system, installed applications and capabilities, and version information for each of the preceding characteristics. The profile could also specifically identify compatible formats corresponding to the various characteristics. Preferably, the profile is maintained in the form of a database file or a computer readable file, such as an ASCII file, which can be communicated to the host.

Preferably, the host computer also maintains profiles for each of its available data items and executable instructions. Profiles for the data may identify its format and which platforms, operating systems, applications, versions, etc. with which the data is compatible. The profiles for the instructions may identify which types of data the instructions operate on and the formats which the instructions are capable of producing.

Upon establishing a communication session, the local computer transmits its profile to the host. Alternatively, after an initial transfer, the host may maintain the profile based on a subscriber ID or local computer ID. The profile could be updated if the characteristics of the local computer change and over the course of the communication session.

When the host receives a data request from the local computer, it can compare the host's profile corresponding to the requested data against the profile corresponding to the local computer. The host can then make the most appropriate choice of data and instructions based on the results of the comparison.

For example, if the profiles indicate that the data is directly compatible, the host can transmit the data with minimal instructions which simply indicate that the data is compatible. If a data translation is required, the host can check the local computer's profile to see if a data translator is available on the local computer. If a translator is available, the host computer can transmit the data with the appropriate instructions to the local computer's translator to translate the data. If no translator is available, the host can compare the profile of the data with the profiles of the various instructions on the host to see if any of the instructions contain an executable data translator which could be downloaded with the data. If appropriate instructions are available, the host can transmit the data together with the instructions to translate the data on the local computer. If no match is found in the profiles of either the local computer or the host instructions, then the data is presumably incompatible and should not be transmitted unless the user indicates that the user wants the incompatible data. In this situation, the host may prompt the user to verify that a download is still desired.

Figure 10:
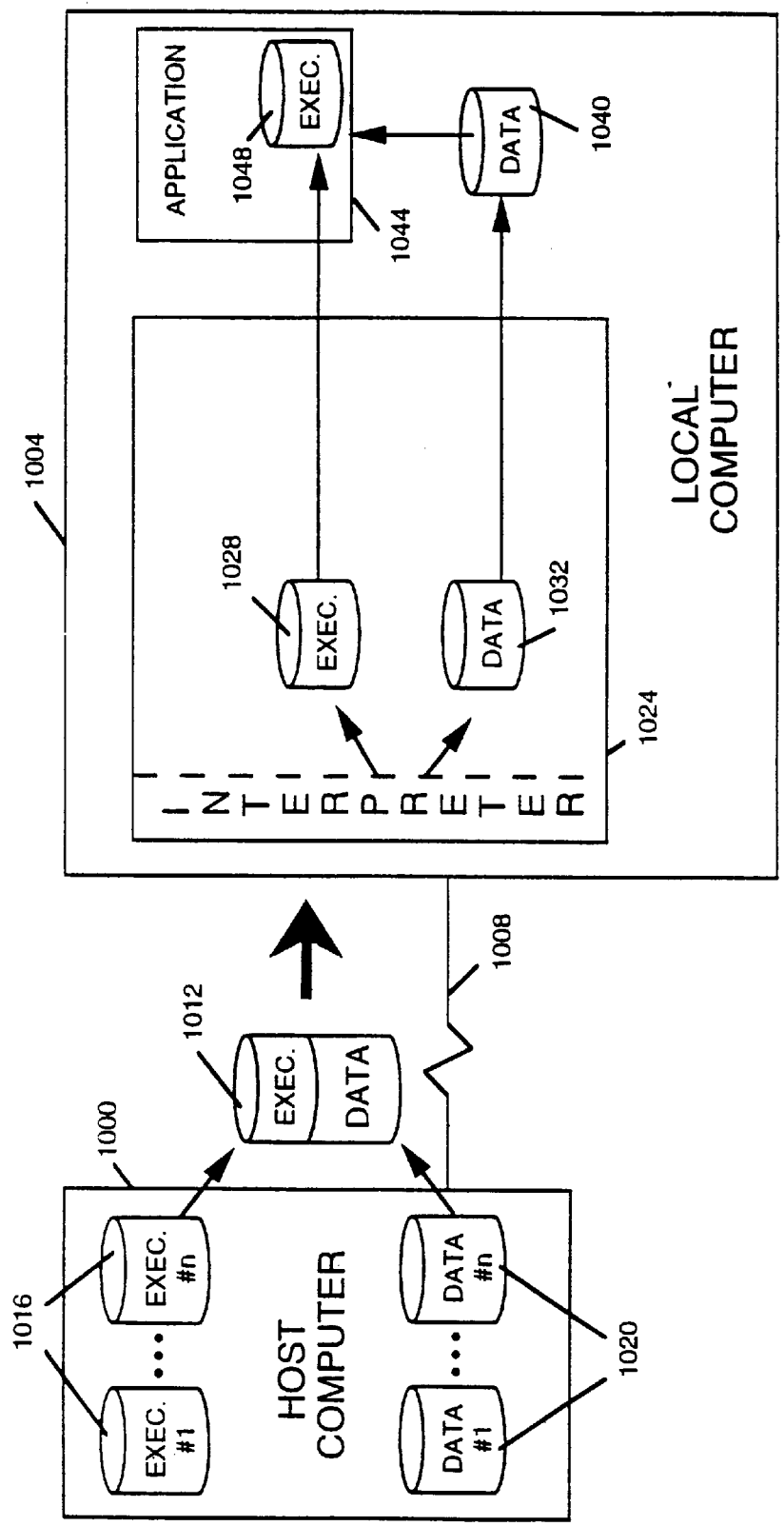
FIG. 10 shows a block diagram of a third embodiment of a system according to the invention for transferring and interpreting data.

FIG. 10 shows a block diagram of a third embodiment of a system according to the invention for transferring and interpreting data. A local computer 1004 is in communication with a host computer 1000 over a communication link 1008. The host computer 1000 has a plurality of executable instructions 1016 and a plurality of data items 1020. The local computer 1004 requests a particular data item from the host computer 1000. The host computer assembles and transmits a data package 1012 comprising the requested data item and its corresponding executable instructions.

The local computer has an interpreter 1024 which receives the data package 1012 and separates the data package 1012 into a local executable portion 1028 and a local data portion 1032. The interpreter installs local executable portion 1028 as an executable module 1048 of local computer application 1044. Local data portion 1032 is stored on local computer 1004 as compatible data 1040. In this embodiment, compatible data 1040 is rendered compatible with local computer application 1044 by the installation of executable module 1048.

The embodiment of FIG. 10 has the advantage of accommodating updates of existing local computer applications to accept new data formats. For example, a word processor application may be purchased with limited data translating and/or importing capabilities. The user may later discover that, in order to utilize a desired data type, enhanced or particular data translating and/or importing capabilities are required. According to the present invention, the user may simply request the desired data and, if the word processor application supports the requested data type through the installation of a module, the data is downloaded together with the required module and instructions for automatically installing the module transparent to the user.

Figure 11:
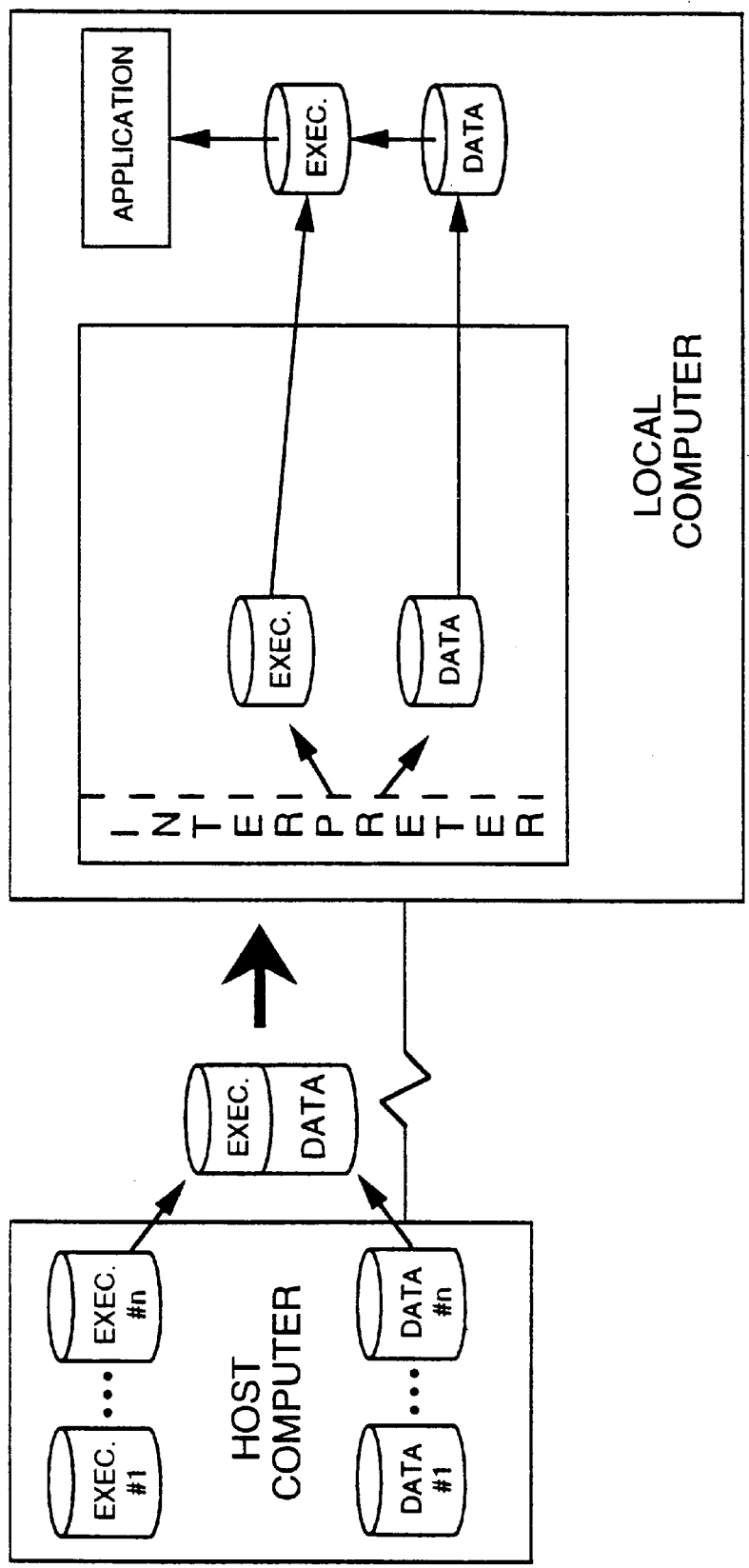
FIG. 11 shows a block diagram of a fourth embodiment of a system according to the invention for transferring and interpreting data.

FIG. 11 shows a block diagram of a fourth embodiment of a system according to the invention for transferring and interpreting data. The fourth embodiment is similar to the second and third embodiments except that the downloaded executable code is stored as a stand alone application on the local computer. In this case, the executable code may operate as a filter or preprocessor for the data in order to achieve compatibility with the application.

It should be apparent to those skilled in the art that the second embodiment can perform similar processing to that described with reference to the third and fourth embodiments by way of appropriate instructions. For example, the executable instructions 428 might comprise an executable code portion which can be installed as a module in application 444. When the interpreter 424 performs the processing step 436, other executable portions of the executable instructions 428 would perform the installation. Still other executable portions of the executable instructions would move the local data portion 424 to its appropriate location on the local computer 404 as compatible data 440. In this situation, as in the third embodiment, local data portion 432 is rendered compatible not through data translation, but rather through the installation of the module in application 444.

While the foregoing embodiments have been described with respect to a local computer in communication with a host computer, one skilled in the art will appreciate that the invention is applicable to any transfer of data between two computers. Further, while the foregoing embodiments have been described as particularly advantageous with respect to ensuring data compatibility, one skilled in the art will appreciate that the invention is applicable to other types of processing which may be desired following and/or incident to the transfer of data.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A method of communicating from a server computer to a user's personal computer via the internet, comprising the steps of:

responding to a user request sent over the internet that is related to a data item on the server computer by forwarding a package of data including a header and the data time to the user's personal computer, the header containing executable code for use by the user's personal computer in processing the data item;

the user's personal computer, in the user request, identifying a particular hardware/software characteristic of the user's personal computer;

the server computer, prior to sending the package of data to the user's personal computer, selecting the header from a plurality of predetermined headers based on the particular hardware/software characteristic of the user's personal computer, wherein the executable code contained in the header is divided into a plurality of header sections corresponding to predetermined personal computer hardware/software characteristics; and the user's personal computer selecting only one of the header sections based on the particular hardware/software characteristic of the user's personal computer.

2. A method as recited in claim 1, wherein the executable code contained in the header includes a decompression routine for use by the user's personal computer in decompressing the package of data.

3. A method as recited in claim 1, wherein the executable code contained in the header includes a decryption routine for use by the user's personal computer in decrypting the package of data.

4. A method as recited in claim 1, wherein the header is divided into subsections, the method including the step of forwarding a subsection of the header.

5. A method as recited in claim 4, wherein the subsection includes a decompression routine for use by the user's personal computer in decompressing the corresponding data package.

6. A method as recited in claim 4, wherein the subsection includes a decryption routine for use by the user's personal computer in decrypting the corresponding data package.

7. A method as recited in claim 1, wherein the particular hardware/software characteristic corresponds to a platform type.

8. A method as recited in claim 1, wherein the particular hardware/software characteristic corresponds to an operating system being run on the second computer.

9. A method of communicating from a personal computer to a server computer on the internet, comprising the steps of:

requesting a data item from the server computer via a user's request sent over the internet;

receiving a package of data including a header and the data item;

running an executable program contained in the header in order to operate on the data item contained in the package of data; and checking the header for viruses prior to running the executable program, wherein the step of checking the header for viruses is accomplished by running a virus checking routine received in a first subsection of the header.

10. A method as recited in claim 9, further comprising the step of identifying characteristics of the personal computer in the user's request.

11. A method as recited in claim 9, wherein the step of running the executable program includes the step of running a decompression routine to decompress data contained in the package of data.

12. A method as recited in claim 9, wherein the step of running the executable program includes the step of running a decryption routine to decrypt data contained in the package of data.

13. A method as recited in claim 9, wherein the virus checking routine received in the first subsection of the header is encrypted, the method further comprising the step of decrypting the virus checking routine according to a decryption routine contained in a second subsection of the header prior to running the virus checking routine.

14. A method as recited in claim 9, further comprising a step of, after the step of checking the header for viruses indicates that no viruses exist in the header, and before the step of running the executable program, checking the data item for viruses and only running the executable program if the checking of the data item for viruses indicates that no viruses exist in the data item.

* * * * *